July 16, 1946.  R. B. CAMPBELL  2,404,122
PISTON BRAKE VALVE
Filed March 30, 1943  2 Sheets-Sheet 1

INVENTOR.
RODNEY B. CAMPBELL,
By HARRIS, KIECH, FOSTER & HARRIS.
FOR THE FIRM
ATTORNEYS.

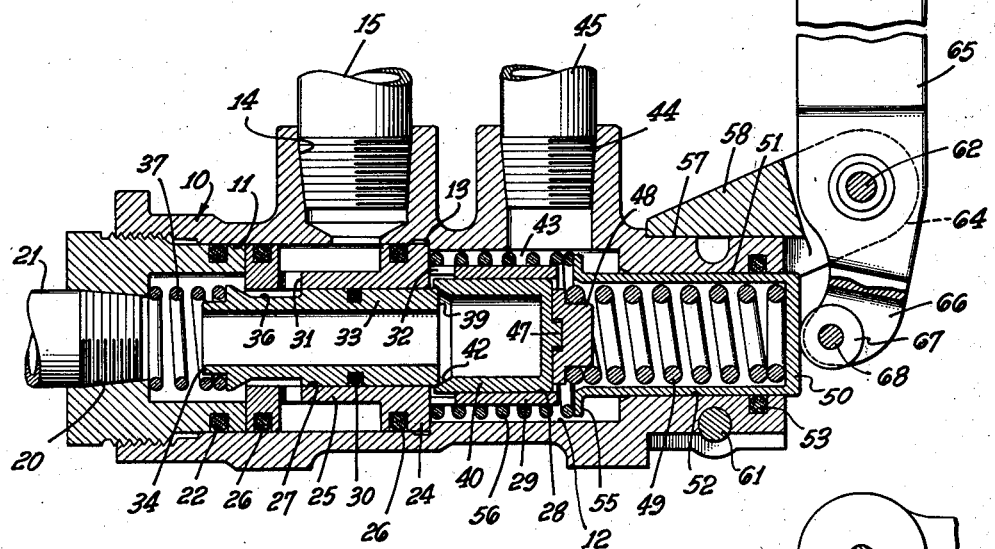
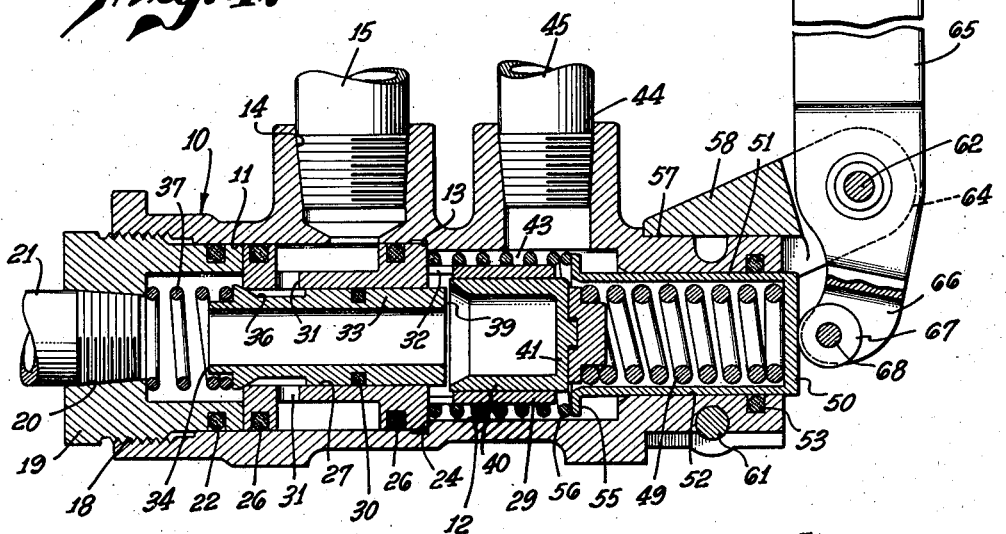

Patented July 16, 1946

2,404,122

UNITED STATES PATENT OFFICE 2,404,122

PISTON BRAKE VALVE

Rodney B. Campbell, Van Nuys, Calif.

Application March 30, 1943, Serial No. 481,078

9 Claims. (Cl. 303—54)

This invention primarily relates to a fluid braking system, and more particularly to such a system having particular utility in the aircraft industry, and therefore will be described in connection therewith. Certain parts and combinations of my system, however, are readily susceptible to other uses, and I do not intend to be limited to the preferred embodiment described.

Aircraft, and particularly aircraft of the large, heavy transport type, are commonly equipped with fluid operated brake systems, in which an operating fluid, such as oil, is transmitted from a source of supply such as a pump through suitable conduits and a valve device to the fluid operated brakes of the vehicle. Valve means are normally provided in the line of the conduits for opening the conduits and permitting the operating fluid to flow to the brake mechanism to operate the same, and the normal operating pressure of the operating fluid is commonly held below two hundred pounds per square inch. In normal operation of such prior art systems it has been discovered, however, that when the brakes are applied to stop the travel of a heavy vehicle, such as an airplane, a large amount of friction is developed in the operation, which dissipates in the form of heat into the brake mechanism. Consequently, the column of operating fluid used to actuate the braking mechanism also absorbs a considerable amount of this frictional heat, which immediately expands the fluid, causing a large increase in the pressure thereof. This pressure increase may quickly raise the pressure of the operating fluid from the normal working pressure of, for example, 200 pounds per square inch, to an abnormally high pressure, sometimes attaining 2000 pounds per square inch or more.

This abnormal rise in pressure of the operating fluid has a number of disadvantages. For example, it creates an abnormal and dangerous pressure strain on the hydraulic equipment. Furthermore, and what is more serious, the increase in pressure increases the braking action, tending to lock the brakes of the airplane, which may operate unevenly between the several brakes, causing serious accidents with their attendant loss of property and life.

It is therefore a primary object of my invention to provide an improved brake valve for aircraft and other vehicles in which the pressure of the operating fluid delivered to the braking mechanism of the vehicle is at all times automatically maintained at an adjusted predetermined maximum.

It is a further object of my invention to provide a novel valve device which will accomplish the foregoing object, and which includes a main valve and an auxiliary valve, the latter being automatically operable in response to a rise in pressure of the operating fluid to relieve the pressure thereon and maintain it at an adjusted predetermined maximum.

Another object of my invention is to provide a fluid operated braking system including a valve device, in which the operation of the actuating or control mechanism, normally manually operated, is not critical to maintain a predetermined braking pressure applied by the operating fluid.

Another object of my invention is to provide a valve device as described above in which the main valve is fully balanced hydraulically and in which the exhaust valve is designed to open automatically upon any slight abnormal rise in the pressure of the fluid delivered to the brakes. While valves of the general type of my valve are in wide use in the aircraft industry, by my specific construction and arrangement of parts I have provided a valve which is more positive in operation and more delicate in its response characteristics than the prior art valves of which I have knowledge, and my specific construction is consequently of major importance.

Other objects and advantages will become evident in the following specification and in the drawings, in which:

Fig. 3 is a view similar to Fig. 1, but showing the parts in a first operating position in which high pressure fluid is being supplied through the valve.

Fig. 4 is a view similar to Fig. 3, but shows the parts in a second operating position in which high pressure has built up within the valve to open the auxiliary exhaust valve to permit the pressure to drop.

Figure 1:
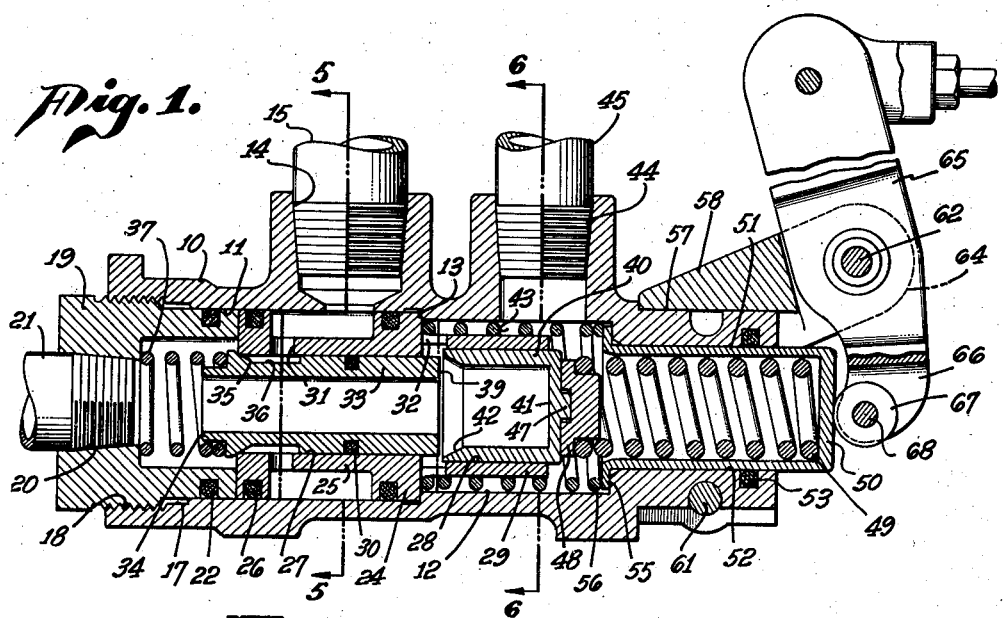
Fig. 1 is a longitudinal vertical sectional view taken through my valve, showing the valve in idle position.

Referring to the drawings, I show a housing 10 having a main bore 11, a portion 12 of which is of slightly reduced diameter to provide an annular shoulder 13 therebetween. The housing 10 is provided with a suitably threaded inlet port 14 which is adapted to receive the end of a pipe or tubing 15 leading from a suitable source of high pressure fluid (not shown). The large end of the main bore 11 is counterbored at 17 and preferably provided with straight threads 18 which receive a pipe fitting 19 having a suitably threaded supply port 20 therein adapted to receive the end of a tubing 21 adapted to convey high pressure fluid from the inlet port 14 to a set of hydraulic brakes or the like (not shown). The pipe fitting 19 is provided with an annular doughnut packing ring 22 adapted to form a fluid-tight seal between the pipe fitting and the main bore 11.

The pipe fitting 19 engages and holds in place against the annular shoulder 13 a tubular valve sleeve member 24 which is provided with an annular recess 25 which registers with the inlet port 14. The valve sleeve member 24 is also provided with suitable annular packing rings 26 capable of forming fluid-tight seals between the valve sleeve member and the bore 11 on each side of the annular recess 25. The valve sleeve member 24 is provided with a minor bore 27 and a major bore 28 of somewhat larger diameter, the valve sleeve member being of reduced external diameter concentric with the major bore 28 to provide a reduced annular portion 29. Communicating between the annular recess 25 and the minor bore 27 are a plurality of circumferentially spaced radial main valve ports 31, and communicating through the reduced annular portion 29 of the valve sleeve are a plurality of circumferentially spaced auxiliary ports 32.

Disposed in the minor bore 27 of the sleeve member 24 is a tubular main valve member 33 adapted for axial movement in the minor bore and ground for a close sliding fit therein and provided with an annular doughnut packing ring 30. The main valve member 33 is provided at its outer end with an annular head 34 of slightly greater diameter than the minor bore 27, the head being provided with an inwardly bevelled seating face 35 which terminates on its inward end in an annular groove 36 formed on the periphery of the main valve member. Engaging between the annular head 34 and the pipe fitting 19 is a relatively weak compression spring 37 adapted normally to urge the main valve member to its seated position on the valve sleeve member, as shown in Fig. 1. As will be noted, when the main valve member 33 is in seated position against the valve sleeve member 24, as shown in Fig. 1, the inner end 39 of the main valve member extends a substantial distance into the major bore 28.

Disposed in the major bore 28 of the valve sleeve member 24 for axial movement therein is a cup-shaped auxiliary valve member 40 of somewhat greater external diameter than that of the main valve member 33. The auxiliary valve member 40 has a central cavity 41 and is provided at its open end with a conical seating face 42 adapted to telescope over and seat against the inner end 39 of the main valve member 33, as shown in Fig. 3. As will be noted from Fig. 1, when the cup-shaped auxiliary valve member 40 is in the position shown therein and out of engagement with the main valve member 33, fluid communication is provided between the supply port 20, through the interior of the main valve member 33, and through the auxiliary valve ports 32 with an annular space 43 formed between the reduced annular portion 29 of the valve sleeve member 24 and the portion 12 of the main bore 11, which in turn communicates with an exhaust port 44 which is suitably threaded to receive an exhaust pipe 45 adapted to communicate with a suitable point of low pressure discharge or exhaust (not shown).

The closed end of the auxiliary valve member 40 is provided with a central boss 47 which registers with a spring follower element 48 which in turn is engaged by an actuating spring 49. The other end of the actuating spring 49 engages the end wall 50 of a cylindrical actuating member 51 journalled in a cylindrical opening 52 formed in the end of the housing 10, a fluid-tight seal being provided therebetween by means of an annular packing ring 53. The inner open end of the cylindrical actuating member 51 is provided with an annular flange 55 which is engaged by a compression spring 56 disposed in the annular space 43 and also engaging against the end of the valve sleeve member 24.

Figure 2:
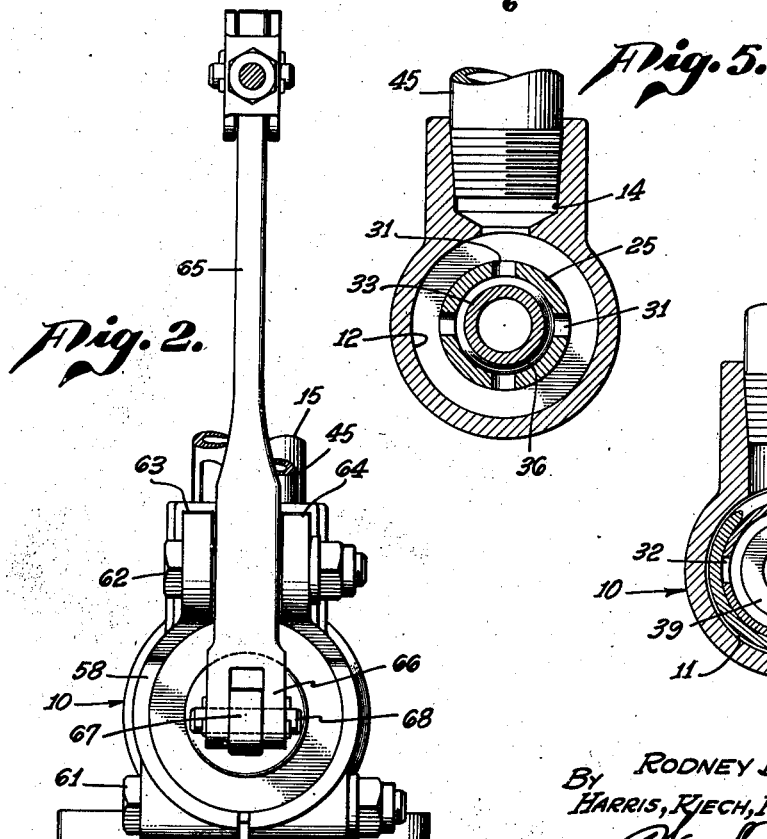
Fig. 2 is an end view of the right-hand end of the valve as shown in Fig. 1.
Figure 5:
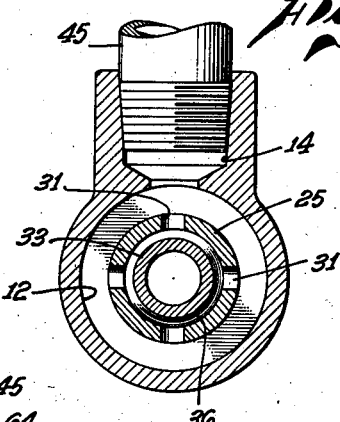
Fig. 5 is a cross-sectional view taken on the line 5—5 of Fig. 1.
Figure 6:
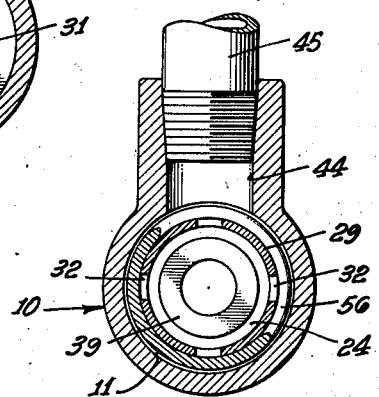
Fig. 6 is a cross-sectional view taken on the line 6—6 of Fig. 1.

Secured to an end 57 of the housing 10 is a split collar member 58 secured to the end 57 by a suitable bolt 61, as best shown in Fig. 2. The split collar 58 is provided with ears 63 and 64 between which an actuating lever 65 is positioned, the actuating lever being pivoted on a pivot bolt 62. The upper end of the actuating lever 65 is suitably connected to a brake pedal or other actuating mechanism adapted to rotate the actuating lever 65 about the pivot 62. The lower end of the actuating lever 65 is provided with a yoke 66 in which an anti-friction roller 67 is rotatably mounted on a cross pin 68. As illustrated in Fig. 1, the anti-friction roller 67 is adapted to engage the end wall 50 of the cylindrical actuating member 51.

As will be understood, in installing my device in a hydraulic system, the high pressure tubing 15 is preferably connected to a high pressure pump or other source of high pressure fluid (not shown) adapted to supply operating fluid under a relatively high pressure such as, for example, 1000 pounds per square inch, to the valve device. The supply tubing 21 is preferably connected to a hydraulic brake or brakes (not shown) adapted to be actuated by the operating fluid delivered by the inlet tubing 15 but at a substantially lower fluid pressure, and the exhaust pipe 45 is preferably connected to a low pressure discharge or the fluid reservoir adapted to supply fluid to the high pressure source (not shown). Although my valve device is particularly designed for supplying operating fluid to a hydraulic brake system, it will be apparent that the valve device may be used in other connections without departing from the spirit of my invention.

In operation, when my valve device is not being actuated to supply high pressure operating fluid to the hydraulic brake system, the parts are normally in the idle position illustrated by Fig. 1. In this position, the actuating lever 65 is in its released position, permitting the cylindrical actuating member 51 to be moved into its rightward position by the compression spring 56, so that the annular flange 55 seats against the housing 10. In this position, the actuating spring 49 is fully expanded, thus permitting the auxiliary valve member 40 to remain in its open position as shown in Fig. 1, in which fluid communication is provided between the supply port 20 and the exhaust port 44 through the bore of the main valve member 33, the auxiliary valve port 32, and the annular space 43. Thus, in this idle position the hydraulic brake system is directly connected to low pressure exhaust so that no fluid pressure is on the brakes normally.

When it is desired to supply operating fluid under pressure from the inlet tubing 15 to the supply tubing 21, the actuating lever 65 is rotated in a clockwise direction toward the position illustrated in Fig. 3, which rotation operates through engagement of the roller 67 with the end wall 50 of the cylindrical actuating member 51 to move the actuating member to the left toward the position illustrated in Fig. 3. Leftward movement of the actuating member 51 compresses the compression spring 56. Such leftward movement also bodily moves the actuating spring 49 to the left, moving with it the cup-shaped auxiliary valve member 40, until the conical seating face 42 thereof seats on the inner end 39 of the main valve member 33. Continued leftward movement of the auxiliary valve member 40 then moves the main valve member 33 to the left toward the position shown in Fig. 3, in which communication is provided between the inlet port 14 and the supply port 20, through the annular recess 25, the main valve ports 31, and the annular groove 36. It is to be noted that when the main valve member 33 is in its closed position as shown in Fig. 1, high pressure fluid from the inlet tubing 15 fills the annular groove 36, but since the ends of the annular groove are equal in cross-sectional area, the main valve member is hydraulically balanced as to such high pressure fluid. Consequently, it requires little force exerted through the auxiliary valve member 40 to move the main valve member 33 from the closed position shown in Fig. 1 toward the open position shown in Fig. 3. It is to be noted, however, that the compression spring 37 resists leftward movement of the main valve member 33, and that as the spring 37 is compressed by such leftward movement its resistance to the movement increases. Consequently, the actuating spring 49 is also increasingly compressed as the actuating lever 65 is rotated from its released position shown in Fig. 1 to its open position shown in Figs. 3 and 4, in which it applies a predetermined maximum fluid pressure to the brakes, such as, for example, 200 pounds per square inch. Thus, the main valve member 33 may be moved by the actuating lever 65 to any degree of opening between its closed position shown in Fig. 1 and its open position shown in Fig. 3. If the main valve member 33 is moved to its open position shown in Fig. 3, obviously the full fluid pressure for which the actuating spring 49 is designed (for example, 200 pounds per square inch) will be applied to the hydraulic brakes through the supply tubing 21. The main valve member 33 acts as a pressure reducing device to reduce the fluid pressure applied to the brakes, the pressure reduction depending upon the degree of opening of the valve. It will therefore be clear that the amount of fluid pressure applied to the brakes depends upon the degree to which the main valve 33 is opened, and that the operator may apply any desired fluid pressure on the brakes up to the maximum pressure for which the spring 49 is designed by simply controlling the amount of rotation of the actuating lever 65.

So long as it is desired to apply a predetermined fluid pressure to the hydraulic brakes, the actuating lever 65 is retained in its operating position, such as shown in Fig. 3, thus maintaining the main valve member 33 in its open position as shown therein. The device is designed so that the main valve member remains in its set open position so long as the fluid pressure in the supply port 29 remains below a predetermined desired maximum. Upon a rise in fluid pressure in the supply port 20, which may be caused, for example, by expansion of the operating fluid in the supply tubing 21 due to heat generated by the frictional application of the hydraulic brake, this rise in pressure is communicated through the bore of the main valve member 33 to the interior of the auxiliary valve member 40, tending to move the latter to the right against the compression of the actuating spring 49. The actuating spring 49 is designed so that, when compressed in the position illustrated in Fig. 3, it maintains the auxiliary valve member 40 in pressure engagement with the end 39 of the main valve member 33, the pressure of engagement depending upon the amount of compression of the actuating spring 49. Thus, the actuating spring 49 may be preferably designed to hold the auxiliary valve member 40 in engagement with the main valve member 33 when in the maximum open position shown in Fig. 3 until the fluid pressure in the supply port 20 rises to a value of, for example, 210 pounds per square inch, at which time this pressure overbalances the action of the actuating spring 49 and forces the auxiliary valve member 40 to the right to the position illustrated in Fig. 4, thus further compressing the actuating spring.

Upon rightward movement of the auxiliary valve member 40, the main valve member 33 also moves to the right in response to the action of the compression spring 37 bearing thereon, so that the inwardly bevelled seating face 35 of the main valve member seats on the end of the valve sleeve member 24 in its closed position, as illustrated in Fig. 4, before the auxiliary valve member 40 moves out of engagement with the main valve member 33. Thus, upon such a pressure rise in the supply port 20, the main valve member 33 first closes communication between the inlet port 14 and the supply port 20, and then continues the movement of the auxiliary valve member 40 to the right to the position shown in Fig. 4 to open communication between the supply port 20 and the exhaust port 44. Operating fluid is then allowed to bleed from the supply tubing 21 directly into the exhaust pipe 45 to reduce the fluid pressure in the supply tubing. This pressure drop continues until the fluid pressure in the supply tubing 21 and supply port 20 drops to the value for which the actuating spring 49 is compressed by the setting of the actuating lever 65, such as, for example, 200 pounds per square inch, at which time the actuating spring 49 again moves the auxiliary valve member 40 to its closed position in engagement with the main valve member 33 to again move the main valve member back to the open position illustrated in Fig. 3. Obviously, the main valve member 33 will not be opened in this manner until the fluid pressure in the supply port 20 drops below the pressure for which the actuating spring 49 is set by the actuating lever 65, and thus there is no fluttering or chattering of the main valve member on its seat. It will thus be understood that with the actuating lever 65 moved to the position shown in Figs. 3 and 4, a predetermined fluid pressure will be supplied to and held in the supply tubing 21, and that any rise in fluid pressure in the supply tubing 21 will cause the main valve member 33 to move to closed position, as illustrated in Fig. 4, and the auxiliary valve member 40 to move to open position to permit a reduction in pressure. This action is entirely automatic, and due to the simplicity of the parts and construction is adapted for and capable of holding the fluid pressure in the supply tubing 21 within very narrow limits of, for example, 5 to 10 pounds per square inch. Furthermore, the specific design of the parts and construction prevents chattering of the valve members, which has been a source of much difficulty in such valve devices heretofore. It will also be evident that if the actuating lever 65 is rotated in a clockwise direction beyond the position shown in Figs. 3 and 4, the main valve member 33 will be additionally moved to the left to further open communication between the annular groove 36 and the supply port 20, thus tending to increase the fluid pressure supply to the supply tubing 21. As soon as such pressure rise overbalances the compressive force exerted by the actuating spring 49, however, the auxiliary valve member 40 will open as described above to bleed off this excess pressure. Thus, it is impossible for the operator to apply a substantially higher fluid pressure to the hydraulic brakes than that for which the actuating spring 49 is designed, which is an important safety factor in the device.

As will be understood, upon the return of the actuating lever to released position, as shown in Fig. 1, the main valve member 33 under action of the compression spring 37 will close as illustrated therein, and the auxiliary valve member 40 will move to its open position as also illustrated therein.

It will also be understood from the foregoing description that any desired fluid pressure may be supplied to the supply tubing 21, up to the predetermined maximum pressure for which the actuating spring 49 is designed. Thus, if the actuating spring 49 is designed to permit a maximum pressure application of 200 pounds per square inch, by only partial rotation of the actuating lever 65 the operator may apply any desired lower fluid pressure to the brakes, such as, for example, 50 pounds per square inch. So long as the actuating lever 65 is maintained in such intermediate position, the lower pressure of 50 pounds per square inch will be held on the brakes because if the supplied pressure tends to rise, the auxiliary valve will open and allow the excess to bleed off through the exhaust port 44, and if the supplied pressure tends to drop, the actuating spring 49 will slightly open the main valve member 33 to permit the pressure to again build up to the desired application. Thus, the device will operate in substantially the same manner regardless of the degree to which the main valve member is opened by the operator.

My valve device is very sensitive to changes in fluid pressure in the supply tubing 21 and operates to hold a desired predetermined fluid pressure in the supply tubing within very close limits, which has not been possible with the prior art devices of which I have knowledge. This superior functioning is due in large part to the fact that the main valve member 33 is substantially hydraulically balanced when closed, its end 39 being of substantially the same area as its other end, and in combination therewith the area of the auxiliary valve member 40 exposed to the fluid pressure of the supply port 20 is as large as possible. This latter feature is achieved by telescoping the auxiliary valve member 40 over the end 39 of the main valve member 33, a self-centering seating thereof being attained by the conical seating face 42 which compensates for any possible slight axial misalignment of the valve members.

Although I have shown and described a preferred embodiment of my invention which has particular application to hydraulic brake systems for aircraft, it will be appreciated that I do not intend to be limited to such a construction, but desire to be afforded the full scope of the following claims.

I claim as my invention:

1. In a valve device, the combination of: a housing having an inlet port, a supply port, an exhaust port, and a valve bore; a tubular main valve member in said bore having an annular head on one end thereof of only slightly larger diameter than said bore and having a passage therein, said main valve member being axially movable in said bore from a closed position in which communication between said inlet port and said supply port through said passage is closed by said head seating against a shoulder formed at one end of said bore to an open position in which said passage provides fluid communication between said inlet port and said supply port; means for yieldably maintaining said main valve member in said closed position; a cup-shaped auxiliary valve member axially movable relative to said main valve member and having an inwardly bevelled seating face on an open end thereof adapted to seat on the periphery of one end of said main valve member; a movable actuating member axially movable in said housing; spring means operatively connecting said actuating member and said auxiliary valve member so that said auxiliary valve member may remain out of engagement with said main valve member to provide fluid communication between said supply port and said exhaust port through said main valve member; means for moving said actuating member axially from a first position to operate through said spring means first to cause said auxiliary valve member to engage said main valve member so that said seating face seats on said periphery to close said fluid communication between said supply port and said exhaust port, and upon continued axial movement of said actuating member then to move said main valve member from said closed position to said open position; and means for normally urging said actuating member to said first position.

2. In a valve device, the combination of: a housing having a bore therein and having an inlet port, a supply port, and an exhaust port; a tubular valve sleeve stationarily disposed in said bore and having a minor bore and a major bore axially aligned therein, said valve sleeve having a main valve port communicating between said minor bore and said inlet port, and having an auxiliary valve port communicating between said major bore and said exhaust port; a tubular main valve member in said minor bore having a passage therein, said main valve member being axially movable in said minor bore from a closed position in which communication between said main valve port and said supply port through said passage is closed to an open position in which said passage provides fluid communication between said main valve port and said supply port; a cup-shaped auxiliary valve member in said major bore and axially movable relative to said main valve member, said auxiliary valve member normally being out of engagement with said main valve member so that fluid communication is provided between said auxiliary valve port and said supply port through said main valve member; an actuating member in said housing; spring means operatively connecting said actuating member and said auxiliary valve member; and means for moving said actuating member to cause said spring means first to move said auxiliary valve member into engagement with said main valve member to close fluid communication between said auxiliary valve port and said supply port, and then to move said auxiliary valve member and said main valve member to move said main valve member from said closed position to said open position.

3. In a valve device, the combination of: a housing having a bore therein and having an inlet port, a supply port, and an exhaust port; a tubular valve sleeve stationarily disposed in said bore and having a minor bore and a major bore axially aligned therein, said valve sleeve having a main valve port communicating between said minor bore and said inlet port, and having an auxiliary valve port communicating between said major bore and said exhaust port; a tubular main valve member in said minor bore having a passage therein and having an annular head on one end thereof of only slightly larger diameter than said minor bore, said main valve member being axially movable in said minor bore from a closed position in which communication between said main valve port and said supply port through said passage is closed by said head seating against one end of said valve sleeve to an open position in which said passage provides fluid communication between said main valve port and said supply port; a cup-shaped auxiliary valve member in said major bore and axially movable relative to said main valve member, said auxiliary valve member normally being out of engagement with said main valve member so that fluid communication is provided between said auxiliary valve port and said supply port through said main valve member; an actuating member in said housing; spring means operatively connecting said actuating member and said auxiliary valve member; and means for moving said actuating member to cause said spring means first to move said auxiliary valve member into engagement with said main valve member to close fluid communication between said auxiliary valve port and said supply port, and then to move said auxiliary valve member and said main valve member to move said main valve member from said closed position to said open position.

4. In a valve device, the combination of: a housing having a bore therein and having an inlet port, a supply port, and an exhaust port; a tubular valve sleeve stationarily disposed in said bore and having a minor bore and a major bore axially aligned therein, said valve sleeve having a main valve port communicating between said minor bore and said inlet port, and having an auxiliary valve port communicating between said major bore and said exhaust port; a tubular main valve member in said minor bore having a passage therein, said main valve member being axially movable in said minor bore from a closed position in which communication between said main valve port and said supply port through said passage is closed to an open position in which said passage provides fluid communication between said main valve port and said supply port; a cup-shaped auxiliary valve member in said major bore and axially movable relative to said main valve member, said auxiliary valve member having an inwardly bevelled annular seating face on an open end thereof adapted to seat on the periphery of one end of said main valve member, said auxiliary valve member normally being out of engagement with said main valve member so that fluid communication is provided between said auxiliary valve port and said supply port through said main valve member; an actuating member in said housing; spring means operatively connecting said actuating member and said auxiliary valve member; and means for moving said actuating member to cause said spring means first to move said auxiliary valve member into engagement with said main valve member to close fluid communication between said auxiliary valve port and said supply port, and then to move said auxiliary valve member and said main valve member to move said main valve member from said closed position to said open position.

5. In a valve device, the combination of: a housing having a bore therein and having an inlet port, a supply port, and an exhaust port; a tubular valve sleeve in said bore engaging a shoulder formed in said bore and having a minor bore and a major bore axially aligned therein, said valve sleeve having a main valve port communicating between said minor bore and said inlet port, and having an auxiliary valve port communicating between said major bore and said exhaust port; sealing means adapted to form a fluid-tight joint between said valve sleeve and said bore; a fitting threaded into one end of said housing and engaging said valve sleeve to hold the same rigidly in said housing; a tubular main valve member in said minor bore having a passage therein, said main valve member being axially movable in said minor bore from a closed position in which communication between said main valve port and said supply port through said passage is closed to an open position in which said passage provides fluid communication between said main valve port and said supply port; a cup-shaped auxiliary valve member in said major bore and axially movable relative to said main valve member, said auxiliary valve member normally being out of engagement with said main valve member so that fluid communication is provided between said auxiliary valve port and said supply port through said main valve member; an actuating member in said housing; spring means operatively connecting said actuating member and said auxiliary valve member; and means for moving said actuating member to cause said spring means first to move said auxiliary valve member into engagement with said main valve member to close fluid communication between said auxiliary valve port and said supply port, and then to move said auxiliary valve member and said main valve member to move said main valve member from said closed position to said open position.

6. In a valve device, the combination of: a housing having a bore therein and having an inlet port, a supply port, and an exhaust port; a tubular valve sleeve rigidly secured in said bore and having a minor bore and a major bore axially aligned therein, said valve sleeve having a main valve port communicating between said minor bore and an annular groove in the periphery of said valve sleeve registering with said inlet port, and having an auxiliary valve port communicating between said major bore and said exhaust port; a tubular main valve member in said minor bore having an annular groove passage formed on its periphery adapted to register with said main valve port, said main valve member being axially movable in said minor bore from a closed position in which communication between said main valve port and said supply port through said passage is closed to an open position in which said passage provides fluid communication between said main valve port and said supply port; a cup-shaped auxiliary valve member in said major bore and axially movable relative to said main valve member, said auxiliary valve member normally being out of engagement with said main valve member so that fluid communication is provided between said auxiliary valve port and said supply port through said main valve member; an actuating member in said housing; spring means operatively connecting said actuating member and said auxiliary valve member; and means for moving said actuating member to cause said spring means first to move said auxiliary valve member into engagement with said main valve member to close fluid communication between said auxiliary valve port and said supply port, and then to move said auxiliary valve member and said main valve member to move said main valve member from said closed position to said open position.

7. In a valve device, the combination of: a housing having a main bore therein and having an inlet port, a supply port, and an exhaust port; a tubular valve sleeve in said main bore and having a minor bore and a major bore axially aligned therein, said valve sleeve having an annular portion of reduced external diameter concentric with said major bore to provide an annular space between said annular portion and said main bore communicating with said exhaust port, and having a main valve port communicating between said minor bore and said inlet port, and having an auxiliary valve port communicating between said major bore and said annular space; a tubular main valve member in said minor bore having a passage therein, said main valve member being axially movable in said minor bore from a closed position in which communication between said main valve port and said supply port through said passage is closed to an open position in which said passage provides fluid communication between said main valve port and said supply port; a cup-shaped auxiliary valve member in said major bore and axially movable relative to said main valve member from an open position in which it is out of engagement with said main valve member to open fluid communication between said auxiliary valve port and said supply port through said main valve member to a closed position in which it engages said main valve member to close such communication; an actuating member in said housing and movable in the same direction as said auxiliary valve member; a compression spring disposed in said annular space and engaging between said valve sleeve and said actuating member to tend to urge said actuating member away from said auxiliary valve member to an inoperative position; an actuating spring disposed between said actuating member and said auxiliary member and designed so that when said actuating member is in said inoperative position said actuating spring exerts substantially no force on said auxiliary valve member; and means for moving said actuating member against the action of said compression spring to apply force to said auxiliary valve member through said actuating spring first to move said auxiliary valve member into said closed position and then to move said auxiliary valve member and said main valve member to move the latter to its said open position.

8. In a valve device, the combination of: a housing having an inlet port, a supply port, an exhaust port, and a valve bore; a tubular main valve member in said valve bore and having a passage therein, said main valve member being axially movable in said bore from a closed position in which communication between said inlet port and said supply port through said passage is closed to an open position in which said passage provides fluid communication between said inlet port and said supply port, the ends of said main valve member being exposed to the fluid pressure of said supply port and being hydraulically balanced when said main valve member is in said open position; an auxiliary valve member axially movable relative to said main valve member and adapted to seat on one end of said main valve member without changing substantially the area of said one end exposed to the fluid pressure of said supply port; a movable actuating member axially movable in said housing; spring means operatively connecting said actuating member and said auxiliary valve member so that said auxiliary valve member may remain out of engagement with said main valve member to provide fluid communication between said supply port and said exhaust port through said main valve member; means for moving said actuating member axially from a first position to operate through said spring means first to cause said auxiliary valve member to engage said one end of said main valve member to close said fluid communication between said supply port and said exhaust port, and upon continued axial movement of said actuating member then to move said main valve member from said closed position to said open position; and means disposed between said housing and said actuating member for normally urging said actuating member to said first position.

9. In a valve device, the combination of: a housing having a major bore, an intermediate bore, and a minor bore therein in axial alignment and having an inlet port, a supply port, and an exhaust port; a tubular valve sleeve stationarily disposed in said major bore and having a main bore and an auxiliary bore axially aligned therein, said valve sleeve having a main valve port communicating between said main bore and said inlet port and having an auxiliary valve port communicating between said auxiliary bore and said exhaust port; a tubular main valve member in said main bore and having a passage therein, said main valve member being axially movable in said main bore from a closed position in which communication between said inlet port and said supply port through said main valve port and said passage is closed to an open position in which said passage and said main valve port provide fluid communication between said inlet port and said supply port; a cup-shaped auxiliary valve member in said auxiliary bore and axially movable relative to said main valve member, said auxiliary valve member normally being out of engagement with said main valve member so that fluid communication is provided between said exhaust port and said supply port through said main valve member and said auxiliary valve port; an actuating member disposed in said minor bore; spring means disposed between said actuating member and said auxiliary valve member; means for axially moving said actuating member to cause said spring means first to move said auxiliary valve member into engagement with said main valve member to close fluid communication between said exhaust port and said supply port through said main valve member and said auxiliary valve port, and then to move said auxiliary valve member and said main valve member to move said main valve member from said closed position to said open position; and spring means disposed in said intermediate bore for normally maintaining said main valve member and said auxiliary valve member out of engagement.

RODNEY B. CAMPBELL.